US012513020B2

(12) United States Patent
Zheng et al.

(10) Patent No.: US 12,513,020 B2
(45) Date of Patent: Dec. 30, 2025

(54) ONBOARD DEVICE, AND METHOD AND SYSTEM FOR WIRELESS INTERCONNECTION BETWEEN ONBOARD DEVICE

(71) Applicants: COMMERCIAL AIRCRAFT CORPORATION OF CHINA, LTD., Shanghai (CN); SHANGHAI AIRCRAFT DESIGN AND RESEARCH INSTITUTE OF COMMERCIAL AIRCRAFT CORPORATION OF CHINA, Shanghai (CN)

(72) Inventors: Zhiming Zheng, Shanghai (CN); Jianfeng Miao, Shanghai (CN); Shude Yuan, Shanghai (CN); Lirong Xie, Shanghai (CN); Bowen Jiang, Shanghai (CN); Ze Chen, Shanghai (CN)

(73) Assignees: COMMERCIAL AIRCRAFT CORPORATION OF CHINA, LTD., Shanghai (CN); SHANGHAI AIRCRAFT DESIGN AND RESEARCH INSTITUTE OF COMMERCIAL AIRCRAFT CORPORATION OF CHINA, Shanghai (CN)

( * ) Notice: Subject to any disclaimer, the term of this patent is extended or adjusted under 35 U.S.C. 154(b) by 382 days.

(21) Appl. No.: 18/006,742
(22) PCT Filed: Dec. 25, 2020
(86) PCT No.: PCT/CN2020/139278
  § 371 (c)(1),
  (2) Date: Jan. 25, 2023
(87) PCT Pub. No.: WO2022/021771
  PCT Pub. Date: Feb. 3, 2022

(65) Prior Publication Data
  US 2023/0275782 A1  Aug. 31, 2023

(30) Foreign Application Priority Data
  Jul. 29, 2020 (CN) .......................... 202010741946.9

(51) Int. Cl.
  H04L 12/40 (2006.01)
  H04L 69/08 (2022.01)
(52) U.S. Cl.
  CPC ........ H04L 12/40032 (2013.01); H04L 69/08 (2013.01); H04L 2012/4028 (2013.01)
(58) Field of Classification Search
  CPC .............. H04L 12/40032; H04L 69/08; H04L 2012/4028; H04L 12/40; H04B 7/18506; H04B 7/185; H04W 4/42; H04W 84/06
  See application file for complete search history.

(56) References Cited

U.S. PATENT DOCUMENTS

2015/0373154 A1  12/2015  Voigt et al.
2016/0029409 A1  1/2016  Mueller et al.
(Continued)

FOREIGN PATENT DOCUMENTS

CN  107087311 A  8/2017
CN  108234013 A  6/2018
(Continued)

OTHER PUBLICATIONS

CN109587150A (Year: 2019).*
(Continued)

Primary Examiner — Nizar N Sivji
(74) Attorney, Agent, or Firm — Maier & Maier, PLLC

(57) ABSTRACT

An airborne device which has a bus interface and a dedicated wireless transmission apparatus connected to the bus interface, the dedicated wireless transmission apparatus includes: an interface conversion module; and a wireless transmission module. The interface conversion module is configured to convert bus data received from the bus interface into a data packet suitable for transmission using a radio access technology, and/or to convert a data packet received from the wireless transmission module into bus data corresponding to (Continued)

the bus interface. The wireless transmission module is configured to use the radio access technology to transmit the converted data packet, and/or to receive the data packet transmitted using the radio access technology. In addition, a method and a system for wireless interconnection between airborne devices.

7 Claims, 8 Drawing Sheets

(56) References Cited

U.S. PATENT DOCUMENTS

| | | | |
|---|---|---|---|
| 2018/0007137 A1* | 1/2018 | Watson | H04W 28/0215 |
| 2021/0184764 A1* | 6/2021 | Metzger | H04B 7/18521 |
| 2022/0086741 A1* | 3/2022 | Liao | G08G 5/26 |

FOREIGN PATENT DOCUMENTS

| | | | |
|---|---|---|---|
| CN | 110351382 A | 10/2019 | |
| CN | 111884897 A | 11/2020 | |

OTHER PUBLICATIONS

CN110417454A (Year: 2019).*
CN110446182A (Year: 2019).*
CN_110351382 (Year: 2019).*
CN_112104535 (Year: 2020).*
International Search Report and Written Opinion issued on May 11, 2021, in corresponding International Application No. PCT/CN2020/139278, 12 pages.

* cited by examiner

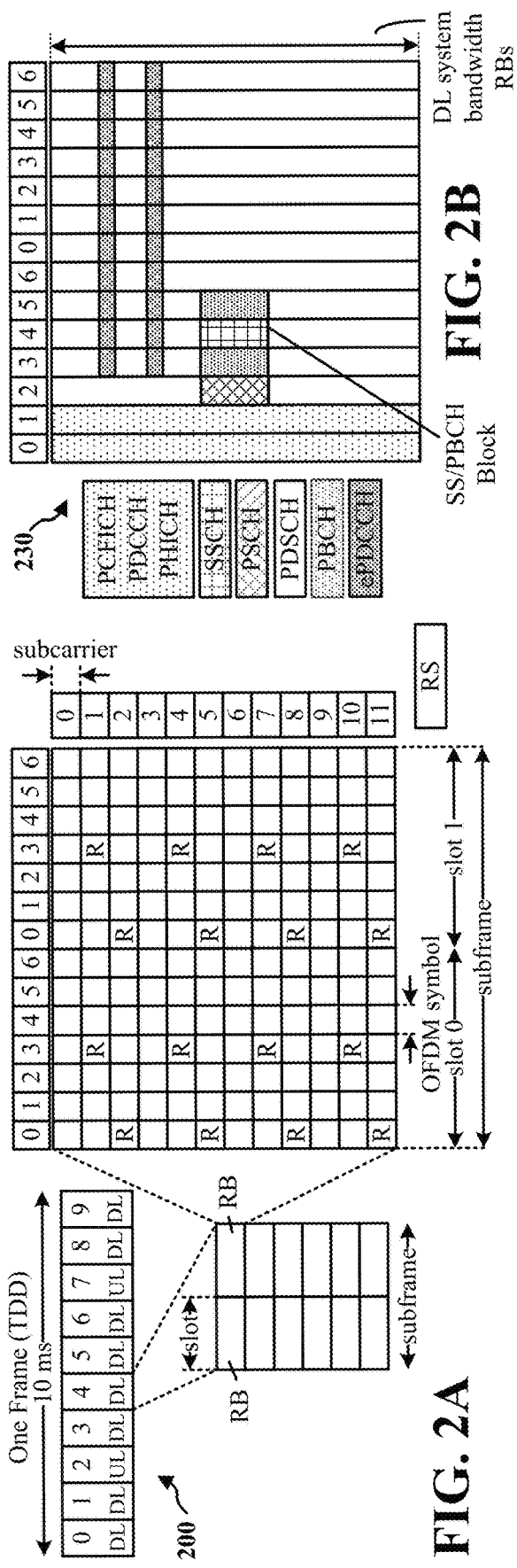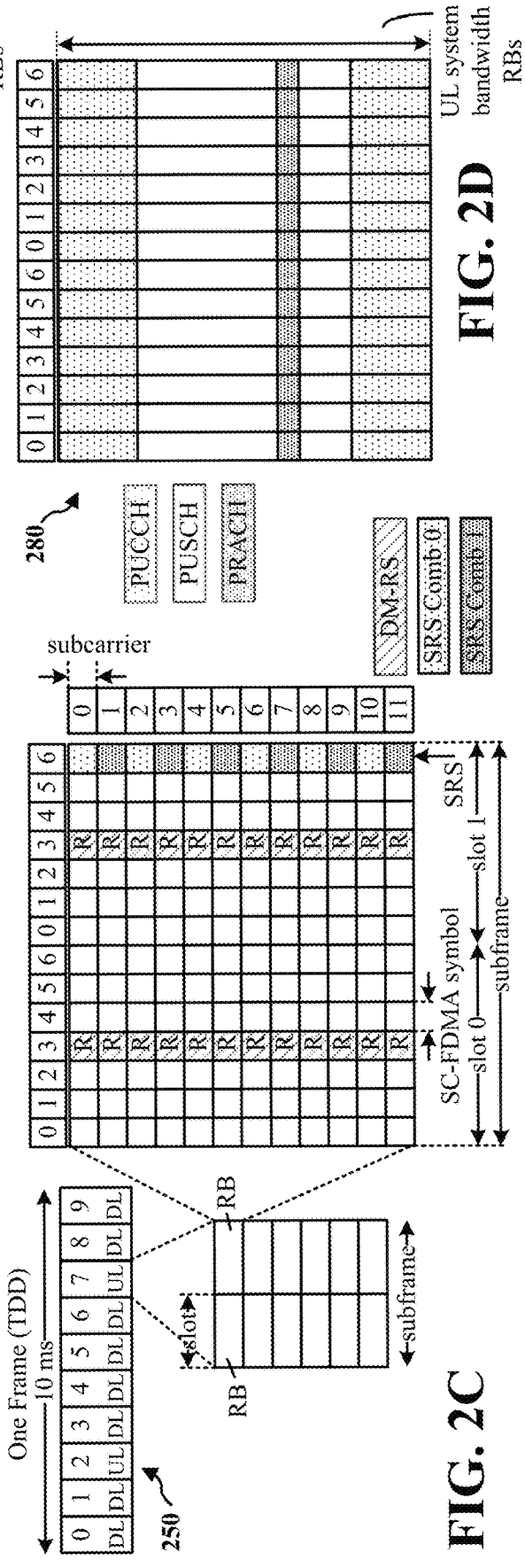

ONBOARD DEVICE, AND METHOD AND SYSTEM FOR WIRELESS INTERCONNECTION BETWEEN ONBOARD DEVICE

TECHNICAL FIELD

The present invention relates to wireless communication, and more specifically to an airborne device and a method and a system for wireless interconnection between airborne devices of an aircraft.

BACKGROUND

In a modern aircraft, there is a large amount of airborne devices (e.g. sensor devices, navigation devices, display devices, flight control devices, etc.). At present, the data transmission between the airborne devices in the aircraft is generally implemented by means of a data bus (for example, an aeroradio ARINC 429 or 664 bus). The data transmission in this way has a low rate. Due to the transmission characteristics of the bus, a large number of airborne devices have to be interconnected in order to perform a specific aircraft function, which greatly increases the number and weight of the aircraft cables. Also, with the increase in operating time, the desoldering of the shielded cables will significantly reduce the quality of signal transmission.

Therefore, there is a need in the art for realizing interconnection between airborne devices of an aircraft in an efficient manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The purpose of the present invention is to realize the interconnection between airborne devices of an aircraft in an efficient and convenient manner.

According to an aspect of the present invention, there is provided an airborne device having an associated bus interface, wherein the airborne device comprises: a dedicated wireless transmission apparatus connected to the bus interface, wherein the dedicated wireless transmission apparatus comprises: an interface conversion module; and a wireless transmission module, wherein the interface conversion module is configured to convert bus data received from the bus interface into a data packet suitable for transmission using a specific radio access technology, and/or to convert a data packet received from the wireless transmission module into bus data corresponding to the bus interface, wherein the wireless transmission module is configured to use the specific radio access technology to transmit the data packet converted by the interface conversion module, and/or to receive a data packet transmitted using the specific radio access technology.

According to another aspect of the present invention, there is provided a system for wireless interconnection between airborne devices of an aircraft, wherein the system comprises: an airborne wireless interconnection network apparatus, wherein the airborne wireless interconnection network apparatus is configured to build an internal wireless communication network for the aircraft; and one or more airborne devices according to the present invention.

According to yet another aspect of the present invention, there is provided a method for wireless interconnection between a first airborne device and a second airborne device of an aircraft, wherein the first airborne device has a first bus interface and a first dedicated wireless transmission apparatus connected to the first bus interface, wherein the second airborne device has a second bus interface and a second dedicated wireless transmission apparatus connected to the second bus interface, wherein the method may comprise: using an airborne wireless interconnection network apparatus to build an internal wireless communication network for the aircraft; converting, by the first dedicated wireless transmission apparatus, first bus data received from the first bus interface into a first data packet suitable for transmission through the wireless communication network and transmitting the first data packet to the airborne wireless interconnection network apparatus; and receiving, by the second dedicated wireless transmission apparatus from the airborne wireless interconnection network apparatus, a second data packet corresponding to the first data packet transmitted by the first dedicated wireless transmission apparatus, converting the second data packet into second bus data corresponding to the second bus interface, and transmitting the second bus data to the second bus interface.

Adopting the airborne device of the present invention and the system and method for wireless interconnection between airborne devices of an aircraft can effectively reduce the number of cables in the aircraft without affecting the structure of the existing airborne devices, thereby reducing the weight of the aircraft, saving the space occupied by the cables, and reducing the workload of designers in arranging the cables.

These and other features and advantages will become apparent, upon reviewing the following Detailed Description in conjunction with the accompanying figures. It is to be understood that both the foregoing general description and the following detailed description are illustrative only and are not restrictive in aspects as claimed.

BRIEF DESCRIPTION OF THE DRAWINGS

So that the manner in which the above-recited features of the present invention can be understood in detail, a more particular description, briefly summarized above, may be by reference to embodiments, some of which are illustrated in the appended drawings. It is to be noted, however, that the appended drawings illustrate only certain typical aspects of the present invention and are therefore not to be considered limiting of its scope, for the description may admit to other equally effective aspects.

FIG. 2A is a diagram illustrating an example of a downlink subframe for a 5G frame structure.

FIG. 2B is a diagram illustrating an example of a downlink channels within the downlink subframe for a 5G frame structure.

FIG. 2C is a diagram illustrating an example of an uplink subframe for a 5G frame structure.

FIG. 2D is a diagram illustrating an example of uplink channels within the uplink subframe for a 5G frame structure.

DETAILED DESCRIPTION

The present invention will be described in detail below in conjunction with accompanying drawings. The features of the present invention will be further manifested in the following detailed description.

As mentioned above, at present, the data transmission between the airborne devices in an aircraft is generally implemented by means of a data bus. The data transmission in this way has a low rate. Due to the transmission characteristics of the bus, a large number of airborne devices have to be interconnected in order to perform a specific aircraft function, which greatly increases the number and weight of the aircraft cables. Also, with the increase in operating time, the desoldering of the shielded cables will significantly reduce the quality of signal transmission. The present invention incorporates the wireless networking technology, keeps the structures of the devices in the aircraft unchanged, configures dedicated wireless transmission modules for various bus interfaces of the devices, and packs the bus data, e.g., otherwise transmitted on an ARINC 429, ARINC 664, ARINC 825, or Ethernet bus, into packets for transmission, thereby achieving wireless interconnection between airborne devices. Because the structures of the existing airborne devices are not changed and the packaging method is simple, the method and system proposed by the present invention can be quickly deployed in the aircraft.

In the present invention, an "airborne device" refers to any electronic device that can be installed in an aircraft, including but not limited to a sensor device, a navigation device, a display device, a flight control device, an in-flight entertainment device and so on. These airborne devices typically have associated bus interfaces to transmit and/or receive data on the corresponding bus. Examples of the bus may include ARINC 429 bus, ARINC 664 bus, ARINC 825 bus, discrete bus, analog bus, Ethernet bus, etc. The data transmitted on the bus may include flight status, flight speed, avionics data, navigation data, video data, audio data, flight control data and so on. The wireless networking technology of the present invention can be implemented using any radio access technology, such as 2G radio access technology, 3G radio access technology, 4G radio access technology, 5G radio access technology, or a radio access technology developed in the future. The present invention is explained below with reference to 5G radio access technology, but it should be understood that the present invention is not limited to 5G radio access technology, and that any other suitable radio access technology may be used.

Figure 1:
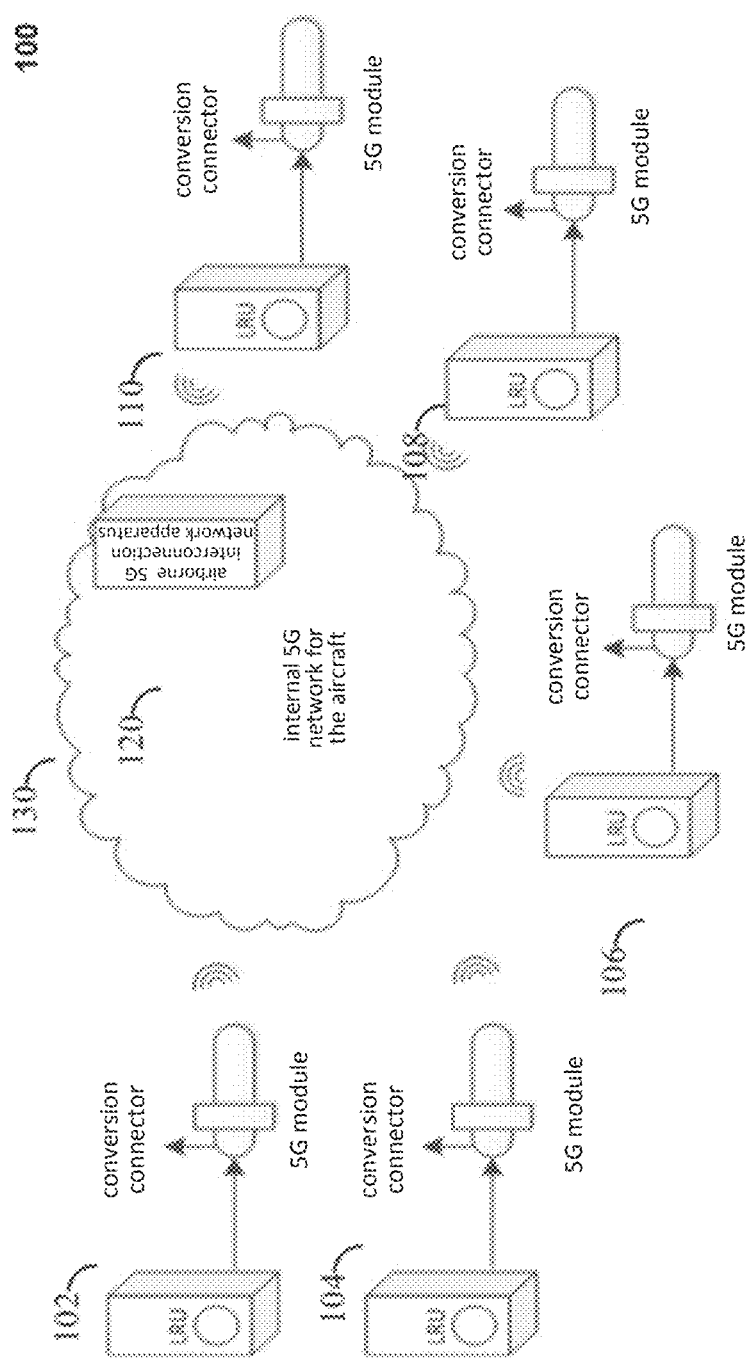
FIG. 1 illustrates a system for wireless interconnection between airborne devices according to one embodiment of the present invention.

FIG. 1 illustrates a system 100 for wireless interconnection between airborne devices of an aircraft according to one embodiment of the present invention. The system 100 may include airborne devices 102, 104, 106, 108 and 110. It should be noted that, in practice, the number of airborne devices may be greater or smaller. Each airborne device may be an airborne line replaceable unit (LRU) and may include an associated bus interface (e.g., an ARINC 429 interface). To enable wireless interconnection between airborne devices, each airborne device may further comprise a dedicated wireless transmission apparatus connected to the bus interface. For example, if the bus interface is an ARINC 429 interface, then the dedicated wireless transmission apparatus connected thereto is a wireless transmission apparatus dedicated for the ARINC 429 interface. Alternatively, if the bus interface is an ARINC 664 interface, then the dedicated wireless transmission apparatus connected thereto is a wireless transmission apparatus dedicated for the ARINC 664 interface. In one embodiment, the airborne devices 102, 104, 106, 108, and 110 may include the same bus interface (e.g., an ARINC 429 interface). In another embodiment, the airborne devices 102, 104, 106, 108, and 110 may include different bus interfaces, for example, the airborne devices 102, 104 may include an ARINC 429 interface, the airborne devices 106, 108 may include an ARINC 664 interface, and the airborne device 110 may include an Ethernet interface. Each dedicated wireless transmission apparatus may include an interface conversion module (for example, a conversion connector shown in FIG. 1) and a wireless transmission module (for example, a 5G module shown in FIG. 1). The interface conversion module may be configured to convert bus data output by the bus interface into a data packet suitable for transmission using 5G radio access technology (for example, directly pack the bus data according to the 5G protocol, or convert the bus data into original data and then pack the original data according to the 5G protocol) and send the generated data packet to the wireless transmission module. In addition, the interface conversion module may also be configured to unpack a data packet received from the wireless transmission module and convert it into corresponding bus data for transmission to the corresponding bus interface. The wireless transmission module may be configured to use 5G technology to transmit a data packet received from the interface conversion module to the internal 5G network for the aircraft, and/or use 5G technology to receive a data packet from the internal 5G network for the aircraft.

The system 100 may further include an airborne wireless interconnection network apparatus, for example, an airborne 5G interconnection network apparatus 120. The airborne wireless interconnection network apparatus may be configured to build an internal wireless communication network (e.g., 5G wireless communication network 130) for the aircraft for data communication between airborne devices. The airborne wireless interconnection network apparatus 120 may include a radio access network RAN and a core network. The radio access network RAN may implement any of one or more suitable wireless communication technologies to provide radio access to airborne devices. As an example, the RAN may operate according to the 3rd Generation Partnership Project (3GPP) New Radio (NR) specification, commonly referred to as 5G. The RAN may include one or more airborne base stations. The airborne base station is a network element in the radio access network responsible for radio transmission and reception to and from airborne devices. The wireless communication between the RAN and airborne devices may be described as utilizing the air interface. Transmission over the air interface from an airborne base station to one or more airborne devices may be referred to as downlink (DL) transmission. Transmission from an airborne device to an airborne base station may be referred to as uplink (UL) transmission. In some examples, access to the air interface may be scheduled, with the airborne base station allocating resources for communication among some or all of the airborne devices within its service area. In the present invention, the airborne base station may be responsible for scheduling, assigning, reconfiguring, and releasing resources for one or more airborne devices. The core network may be part of the wireless communication network and may be independent of the radio access technology used in the RAN. In some examples, the core network may be configured according to 5G standards (e.g., 5GC). In the present invention, the core network may perform operations such as data packing, unpacking, centralized management, and sub-packing, and may be connected with other airborne devices in the aircraft to implement functions such as data exchange and logic control.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kHz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs may carry reference (pilot) signals (RS) for the airborne device (indicated as R). The RS may include demodulation RS (DM-RS) and channel state information reference signals (CSI-RS) for channel estimation at the airborne device. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. An airborne device may be configured with an airborne device-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by an airborne device to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by an airborne device to determine a physical layer cell identity group number and radio frame timing. Based on the physical layer identity and the physical layer cell identity group number, the airborne device can determine a physical cell identifier (PCI). Based on the PCI, the airborne device can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The airborne device may additionally transmit sounding reference signals (SRS) in the last symbol of a subframe. The SRS may have a comb structure, and an airborne device may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the airborne device to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
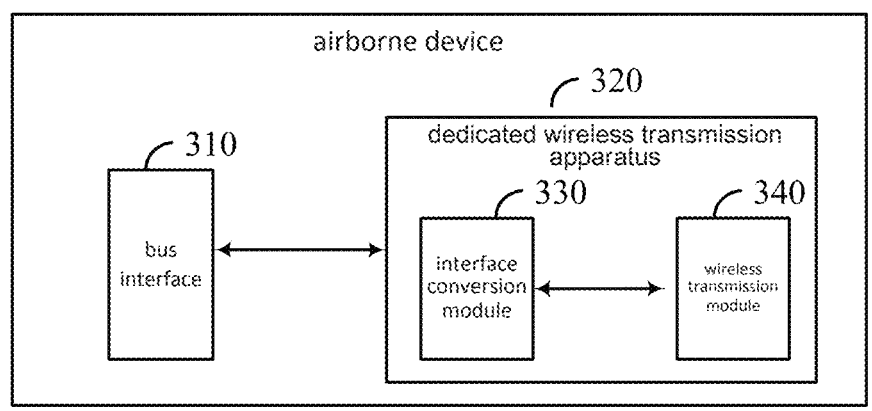
FIG. 3 illustrates a block diagram of an airborne device according to one embodiment of the present invention.

FIG. 3 illustrates a block diagram of an airborne device 300 according to one embodiment of the present invention. The airborne device 300 may comprise a bus interface 310. The bus interface 310 may be one of an ARINC 429 interface, an ARINC 664 interface, an ARINC 825 interface, an Ethernet interface, a discrete interface, or an analog interface. Bus data output by the bus interface 310 may be transmitted on the corresponding bus. For example, the bus data output by an ARINC 429 interface may be transmitted on a corresponding ARINC 429 bus, the bus data output by an ARINC 664 interface may be transmitted on a corresponding ARINC 664 bus, and so on. In the present invention, in order to enable wireless communication between airborne devices, the airborne device 300 may be equipped with a dedicated wireless transmission apparatus 320. The dedicated wireless transmission apparatus 320 may correspond to the bus interface 310 of the airborne device 300. For example, if the bus interface 310 of the airborne device 300 is an ARINC 429 interface, then the dedicated wireless transmission apparatus 320 may be an ARINC 429 dedicated wireless transmission apparatus. In one embodiment, the dedicated wireless transmission apparatus 320 may have a fixed IP address to distinguish different airborne devices.

The dedicated wireless transmission apparatus 320 may include an interface conversion module 330 and a wireless transmission module 340. The interface conversion module 330 and the wireless transmission module 340 may be implemented in software, hardware, and/or a combination of software and hardware. When the airborne device 300 is a transmitting airborne device, the interface conversion module 330 may be configured to convert bus data received from the bus interface 310 into data packets suitable for transmission using 5G technology. In one embodiment, the conversion may include directly packing the bus data according to the 5G protocol to generate a data packet for transmission by the wireless transmission module 340. The data packet may contain a device identifier of the transmitting airborne device (for example, the IP address of the dedicated wireless transmission apparatus of the transmitting airborne device), a device identifier of the receiving airborne device (for example, the IP address of the dedicated wireless transmission apparatus of the receiving airborne device), and bus data to be exchanged, etc. In another embodiment, the conversion may include converting the bus data into original data according to the corresponding bus specification (for example, by decoding the bus data and removing the data added according to the bus specification), and then using the 5G protocol to pack the original data to generate a data packet for transmission by the wireless transmission module 340. In this embodiment, since the airborne device transmits original data, all airborne devices with different types of bus interfaces can receive and use the original data.

When the airborne device 300 is a receiving airborne device, the interface conversion module 330 may be configured to convert a data packet received from the wireless transmission module 340 into bus data corresponding to the bus interface 310. In an embodiment where the transmitting airborne device directly packs the bus data according to the 5G protocol, the interface conversion module 330 can perform an unpacking operation for the data packet according to the 5G protocol, and transmit the unpacked bus data to the bus interface 310. In an embodiment where the transmitting airborne device packs the original data according to the 5G protocol, the interface conversion module 330 can perform an unpacking operation for the data packet according to the 5G protocol to obtain the original data, and then generate the corresponding bus data according to the corresponding bus specification and transmit the bus data to the corresponding bus interface 310.

The wireless transmission module 340 may be configured to use 5G radio access technology to transmit a data packet converted by the interface conversion module 330 to the airborne base station, and/or use 5G radio access technology to receive a data packet from the airborne base station. The communication between the wireless transmission module and the airborne base station will be described in detail below with reference to FIG. 5. In one embodiment, the wireless transmission module 340 may be configured to determine whether the data packet is directed to the airborne device 300 by parsing the IP address included in the received data packet. For example, if the IP address included in the received data packet matches the IP address of the dedicated wireless transmission apparatus 320 of the airborne device 300, the wireless transmission module 340 may transmit the data packet to the interface conversion module 330; otherwise, the wireless transmission module 340 may discard the packet without transmitting it to the interface conversion module 330.

Figure 4:
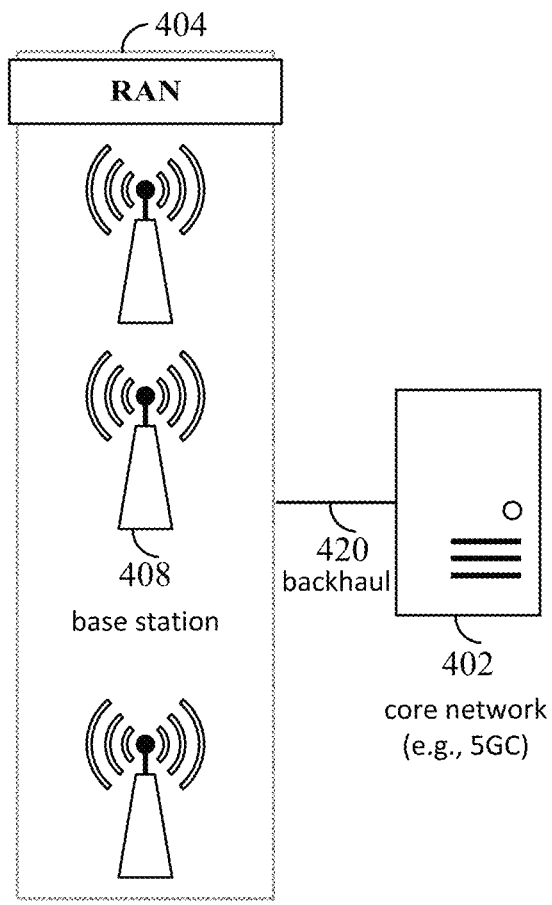
FIG. 4 illustrates a block diagram of an airborne wireless interconnection network apparatus according to one embodiment of the present invention.

FIG. 4 illustrates a block diagram of an airborne wireless interconnection network apparatus 400 according to one embodiment of the present invention. The airborne wireless interconnection network apparatus 400 may be used to build an internal wireless communication network for the aircraft (for example, a 2G wireless communication network, a 3G wireless communication network, a 4G wireless communication network, a 5G wireless communication network, or a wireless communication network developed in the future). The airborne wireless interconnection network apparatus 400 may include a core network 402 and a radio access network RAN 404. RAN 404 may implement any of one or more suitable wireless communication technologies to provide radio access to airborne devices. RAN 404 may include one or more airborne base stations 408. The airborne base station 408 is a network element in the radio access network responsible for radio transmission and reception to and from airborne devices. The airborne base station 408 may be responsible for scheduling, assigning, reconfiguring, and releasing resources for one or more airborne devices. RAN 404 may be connected with the core network 402 (e.g., 5GC) via backhaul 420. In one embodiment, the core network 402 may perform operations such as data packing, unpacking, centralized management, and sub-packing, and may be connected with other airborne devices in the aircraft to implement functions such as data exchange and logic control.

Figure 5:
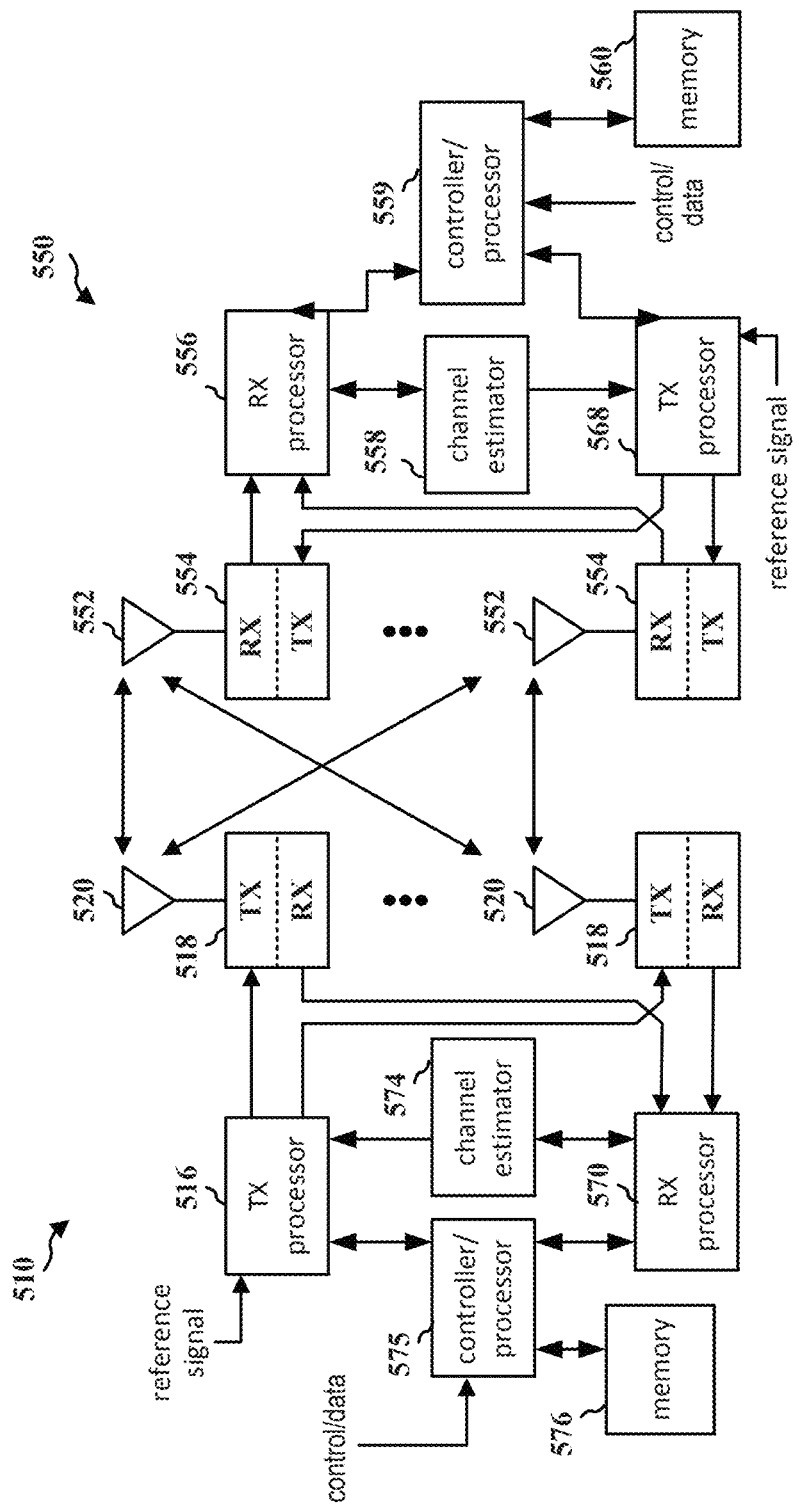
FIG. 5 illustrates a diagram of an airborne device in communication with an airborne base station according to one embodiment of the present invention.

FIG. 5 illustrates a diagram of a wireless transmission module 550 of an airborne device in communication with an airborne base station 510 according to one embodiment of the present invention. In the DL, data from the core network may be provided to a controller/processor 575. The controller/processor 575 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 575 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for airborne device measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 516 and the receive (RX) processor 570 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 516 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the wireless transmission module 550. Each spatial stream may then be provided to a different antenna 520 via a separate transmitter 518TX. Each transmitter 518TX may modulate an RF carrier with a respective spatial stream for transmission.

At the wireless transmission module 550 of the airborne device, each receiver 554RX receives a signal through its respective antenna 552. Each receiver 554RX recovers information modulated onto an RF carrier and provides the information to the receive (RX) processor 556. The TX processor 568 and the RX processor 556 implement layer 1 functionality associated with various signal processing functions. The RX processor 356 may perform spatial processing on the information to recover any spatial streams destined for the wireless transmission module 550 of the airborne device. If multiple spatial streams are destined for the wireless transmission module 550, they may be combined by the RX processor 556 into a single OFDM symbol stream. The RX processor 556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the airborne base station 510. These soft decisions may be based on channel estimates computed by the channel estimator 558. The soft decisions are then decoded and deinterleaved to recover the data and control signals that were originally transmitted by the airborne base station 510 on the physical channel. The data and control signals are then provided to the controller/processor 559, which implements layer 3 and layer 2 functionality.

The controller/processor 559 can be associated with a memory 560 that stores program codes and data. The memory 560 may be referred to as a computer-readable medium. In the UL, the controller/processor 559 provides demultiplexing between transport and logical channels, packet reassembly, deciphering, header decompression, and control signal processing to recover data from the core network. The controller/processor 559 is also responsible for error detection using an ACK and/or NACK protocol to support HARQ operations.

Similar to the functionality described in connection with the DL transmission by the airborne base station 510, the controller/processor 559 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 558 from a reference signal or feedback transmitted by the base station 510 may be used by the TX processor 568 to select the appropriate coding and modulation schemes, and to facilitate spatial processing. The spatial streams generated by the TX processor 568 may be provided to different antenna 552 via separate transmitters 554TX. Each transmitter 554TX may modulate an RF carrier with a respective spatial stream for transmission.

The UL transmission is processed at the base station 510 in a manner similar to that described in connection with the receiver function at the wireless transmission module 550. Each receiver 518RX receives a signal through its respective antenna 520. Each receiver 518RX recovers information modulated onto an RF carrier and provides the information to a RX processor 570.

The controller/processor 575 can be associated with a memory 576 that stores program codes and data. The memory 576 may be referred to as a computer-readable medium. In the UL, the controller/processor 375 provides demultiplexing between transport and logical channels, packet reassembly, deciphering, header decompression, control signal processing to recover data from the wireless transmission module 550. Data from the controller/processor 575 may be provided to the core network. The controller/processor 575 is also responsible for error detection using an ACK and/or NACK protocol to support HARQ operations.

Figure 6:
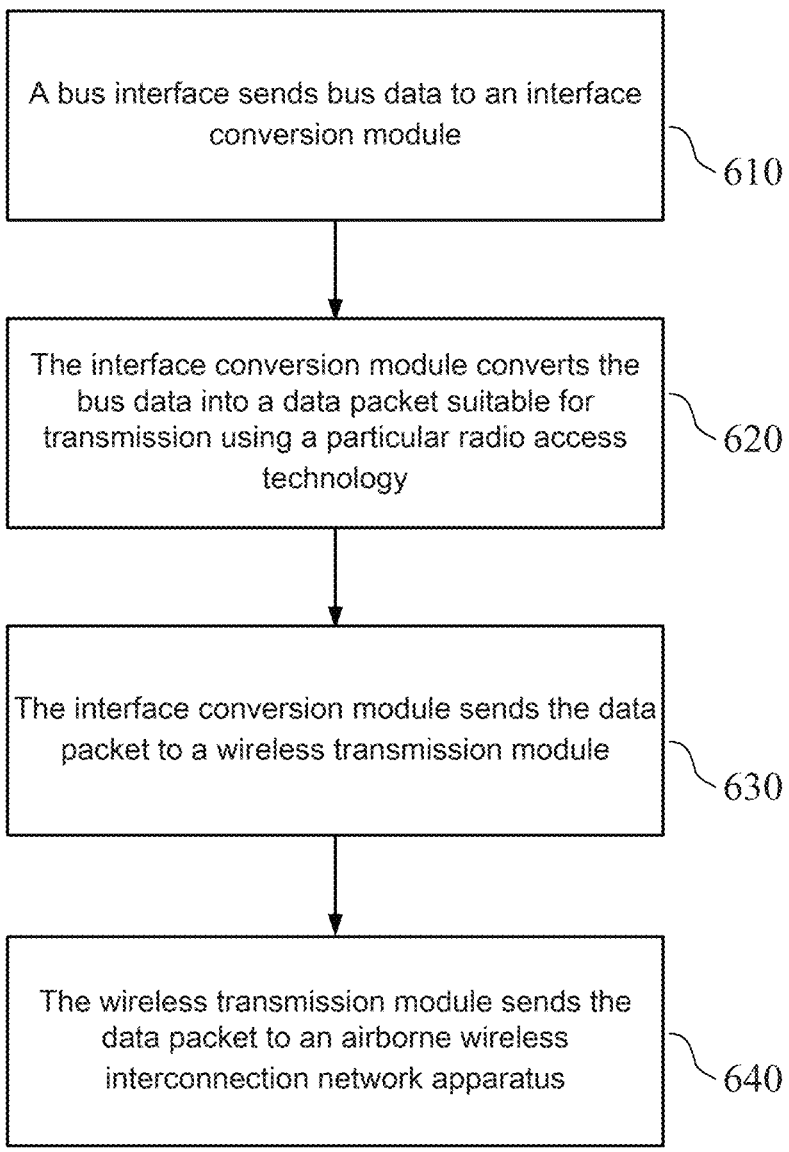
FIG. 6 illustrates a flow chart of a method for sending data by an airborne device according to one embodiment of the present invention.

FIG. 6 illustrates a flow chart of a method 600 for sending data by an airborne device according to one embodiment of the present invention. In some examples, the method 600 may be performed by the airborne device 300 illustrated in FIG. 3. In some examples, the method 600 may be performed by any suitable device or apparatus for performing the functions or algorithms described below.

At block 610, a bus interface of the airborne device may send bus data to an interface conversion module of a dedicated wireless transmission apparatus. For example, the bus interface 310 of the airborne device 300 may send bus data to the interface conversion module 330 of the dedicated wireless transmission apparatus 320. The bus data may include data to be otherwise transmitted on the corresponding bus. In one embodiment, the dedicated wireless transmission apparatus may have a fixed IP address. In another embodiment, the dedicated wireless transmission apparatus may have a dynamic IP address assigned by the internal wireless network for the aircraft.

At block 620, the interface conversion module may convert the bus data into a data packet suitable for transmission using a particular radio access technology. For example, the interface conversion module 330 may convert the bus data into a data packet suitable for transmission using a 5G radio access technology. The conversion may include directly packing the bus data according to the 5G protocol to generate a data packet for the 5G protocol, or converting the bus data into original data and then packing the original data according to the 5G protocol to generate a data packet for the 5G protocol. In one embodiment, the generated data packet may contain a device identifier of the transmitting airborne device (for example, the IP address of the dedicated wireless transmission apparatus of the transmitting airborne device), a device identifier of the receiving airborne device (for example, the IP address of the dedicated wireless transmission apparatus of the receiving airborne device), and bus data to be exchanged.

At block 630, the interface conversion module may send the generated data packet to a wireless transmission module for transmission. For example, the interface conversion module 330 may send the generated data packet for the 5G protocol to the wireless transmission module 340 for transmission.

At block 640, the wireless transmission module may transmit the data packet to an airborne wireless interconnection network apparatus. For example, the wireless transmission module 340 may access the 5G wireless communication network established by the airborne wireless interconnection network apparatus 400, and use the 5G technology to send the data packet for the 5G protocol to the airborne base station 408 of the airborne wireless interconnection network apparatus 400.

Figure 7:
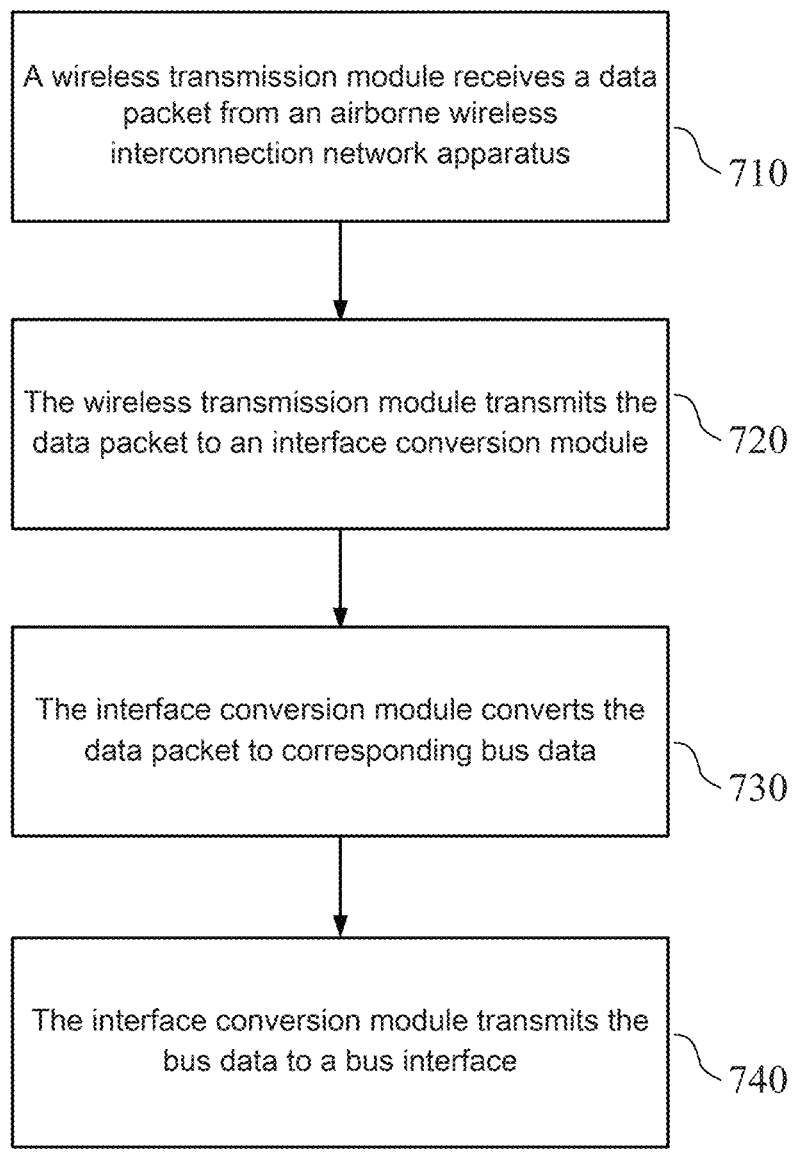
FIG. 7 illustrates a flow chart of a method for receiving data by an airborne device according to one embodiment of the present invention.

FIG. 7 illustrates a flow chart of a method 700 for receiving data by an airborne device according to one embodiment of the present invention. In some examples, the method 700 may be performed by the airborne device 300 illustrated in FIG. 3. In some examples, the method 700 may be performed by any suitable device or apparatus for performing the functions or algorithms described below.

At block 710, a wireless transmission module may receive a data packet from an airborne wireless interconnection network apparatus. For example, the wireless transmission module 340 may access the 5G wireless communication network established by the airborne wireless interconnection network apparatus 400, and receive a data packet from the airborne base station 408 of the airborne wireless interconnection network apparatus 400. The data packet may correspond to a data packet transmitted by a wireless transmission module of the transmitting airborne device (e.g., another airborne device). After the core network of the airborne wireless interconnection network apparatus receives the data packet transmitted by the transmitting airborne device through the airborne base station, the core network may unpack the data packet and distribute the data based on the device identifier of the receiving airborne device (e.g., the IP address of the dedicated wireless transmission apparatus) contained in the data packet (e.g., by repacking the data and transmitting it to the receiving airborne device).

At block 720, the wireless transmission module may transmit the received data packet to an interface conversion module. For example, the wireless transmission module 340 may transmit the received data packet to the interface conversion module 330. In one embodiment, the wireless transmission module may first determine whether the IP address in the received data packet matches the IP address of the wireless transmission module. If so, the wireless transmission module sends the received data packet to the interface conversion module; otherwise, the data packet is discarded.

At block 730, the interface conversion module may convert the data packet into corresponding bus data. For example, the interface conversion module 330 may convert the data packet received from the wireless transmission module 340 into bus data corresponding to the bus interface 310 (e.g., ARINC 429 data corresponding to the ARINC 429 bus). The conversion may include unpacking of the data packet in accordance with the 5G protocol conforming to the aviation standard.

At block 740, the interface conversion module may transmit the bus data to a bus interface. For example, the interface conversion module 330 may transmit the converted bus data to the bus interface 310.

Figure 8:
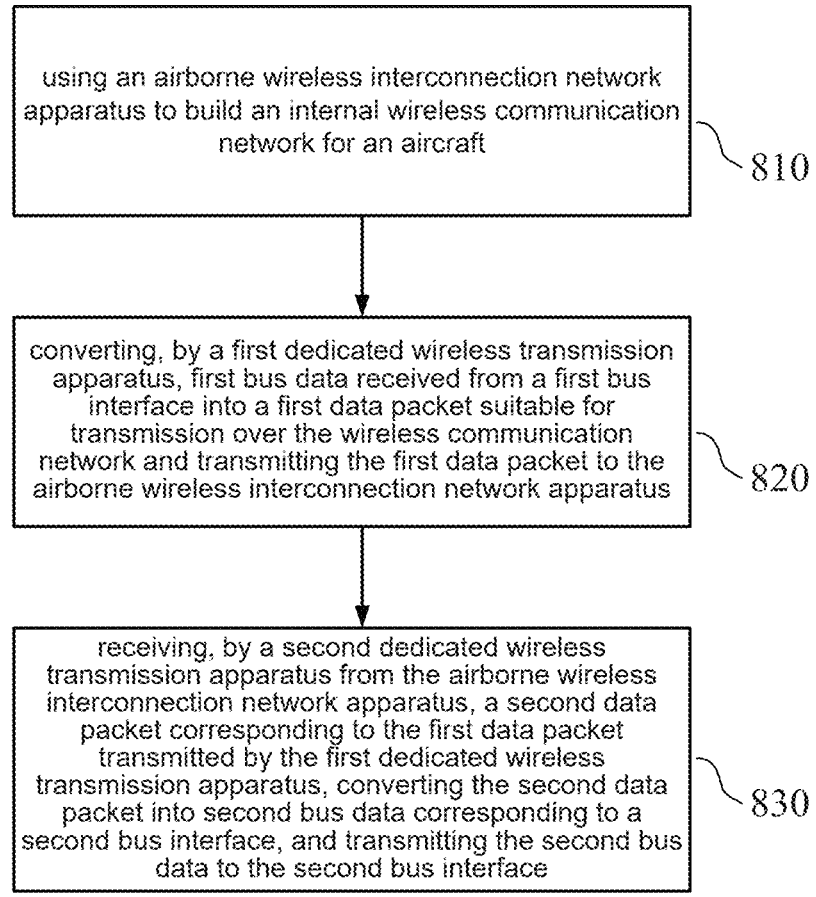
FIG. 8 illustrates a flow chart of a method for wireless interconnection between a first airborne device and a second airborne device according to one embodiment of the present invention.

FIG. 8 illustrates a flow chart of a method 800 for wireless interconnection between a first airborne device and a second airborne device of an aircraft according to one embodiment of the present invention. In some examples, the method 800 may be jointly performed by the system 100 illustrated in FIG. 1, the airborne device 300 illustrated in FIG. 3, and the airborne wireless interconnection network apparatus 400 illustrated in FIG. 4. In some examples, the method 800 may be performed by any suitable device or apparatus for performing the functions or algorithms described below.

The first airborne device may have a first bus interface and a first dedicated wireless transmission apparatus connected to the first bus interface, and the second airborne device may have a second bus interface and a second dedicated wireless transmission apparatus connected to the second bus interface. In one embodiment, the first bus interface and the second bus interface may be of the same type of bus interface (e.g., an ARINC 429 interface), and thus the first dedicated wireless transmission apparatus and the second dedicated wireless transmission apparatus may be of the same type of dedicated wireless transmission apparatus (e.g., an ARINC 429 dedicated wireless transmission apparatus). In another embodiment, the first bus interface and the second bus interface may be of different types of bus interfaces (for example, the first bus interface may be an ARINC 429 interface and the second bus interface may be an ARINC 664 interface), and thus the first dedicated wireless transmission apparatus and the second dedicated wireless transmission apparatus may be of different types of dedicated wireless transmission apparatuses (for example, the first dedicated wireless transmission apparatus may be an ARINC 429 dedicated wireless transmission apparatus, and the second dedicated wireless transmission apparatus may be an ARINC 664 dedicated wireless transmission apparatus). In one embodiment, the first dedicated wireless transmission apparatus and the second dedicated wireless transmission apparatus may each have a fixed IP address. In another embodiment, the first dedicated wireless transmission apparatus and the second dedicated wireless transmission apparatus may each have a dynamic IP address assigned by the airborne wireless interconnection network apparatus.

The method 800 may begin at block 810, where an airborne wireless interconnection network apparatus may be used to build an internal wireless communication network for the aircraft. For example, the airborne wireless interconnection network apparatus 400 may be used to build an internal wireless communication network for the aircraft. The wireless communication network may be a 2G wireless communication network, a 3G wireless communication network, a 4G wireless communication network, a 5G wireless communication network, or any other suitable wireless communication network. After the internal wireless communication network is established, the first airborne device and the second airborne device can access the wireless communication network according to the corresponding wireless communication protocol, and connect with the airborne base station.

At block 820, if the first airborne device has data to send to the second airborne device, then the first dedicated wireless transmission apparatus of the first airborne device may convert first bus data received from the first bus interface into a first data packet suitable for transmission over the wireless communication network, and transmit the first data packet to the airborne wireless interconnection network apparatus. For example, the interface conversion module of the first dedicated wireless transmission apparatus may convert the first bus data received from the first bus interface into a first data packet suitable for transmission through the 5G wireless communication network, and the wireless transmission module of the first dedicated wireless transmission apparatus may use 5G technology to send the first data packet to the airborne base station of the airborne wireless interconnection network apparatus. The first data packet may contain a device identifier of the first airborne device (for example, the IP address of the dedicated wireless transmission apparatus of the first airborne device), a device identifier of the second airborne device (for example, the IP address of the dedicated wireless transmission apparatus of the second airborne device), and data to be exchanged, etc. In the case where the first airborne device and the second airborne device have the same type of bus interface, the conversion may include directly packing the first bus data according to a wireless communication protocol (for example, 5G protocol) to generate the first data packet to be transmitted. Alternatively, in the case where the first airborne device and the second airborne device have different types of bus interfaces, for example in the case where the first airborne device has an ARINC 429 interface and the second airborne device has an ARINC 664 interface, the conversion may include converting the first bus data into original data according to the ARINC 429 specification (e.g., by decoding the first bus data and removing data added according to the ARINC 429 specification such as format field, check field, etc.), and then using a wireless communication protocol (for example, 5G protocol) to pack the original data to generate the first data packet to be transmitted.

At block 830, the second dedicated wireless transmission apparatus of the second airborne device may receive, from the airborne wireless interconnection network apparatus, a second data packet corresponding to the first data packet transmitted by the first dedicated wireless transmission apparatus, convert the second data packet into second bus data corresponding to the second bus interface, and transmit the second bus data to the second bus interface. The second data packet may be generated after the core network of the airborne wireless interconnection network apparatus receives the first data packet sent from the first dedicated wireless transmission apparatus and forwarded by the airborne base station. For example, the core network may unpack the first data packet, and distribute data based on the device identifier of the second airborne device (for example, the IP address of the dedicated wireless transmission apparatus of the second airborne device) contained in the first data packet (for example, repacking the data to generate the second data packet and transmitting the second data packet to the second airborne device). In the case where the first airborne device and the second airborne device have the same type of bus interface, converting the second data packet into second bus data corresponding to the second bus interface may include performing an unpacking operation for the second data packet directly according to the wireless communication protocol (for example, 5G protocol), and then transmitting the second bus data obtained after the unpacking to the second bus interface. Alternatively, in the case where the first airborne device and the second airborne device have different types of bus interfaces, the conversion may include performing an unpacking operation for the second data packet according to the wireless communication protocol (for example, 5G protocol) to obtain the original data, generating the corresponding second bus data according to the corresponding bus specification (for example, ARINC 664 specification) (e.g., adding data such as format field, check field, and encoding the data according to the ARINC 664 specification), and then transmitting the second bus data to the second bus interface.

Although aspects of the present invention have been described so far with reference to the accompanying drawings, the above-described method, system and apparatus are examples only, and the scope of the present invention is not limited to these aspects, but only limited by the appended claims and their equivalents. Various components may be omitted or may also be substituted for equivalent components. In addition, the steps may also be implemented in an order different from that described in the present invention. Also, various components may be combined in various ways. It is also important to note that, as technology advances, many of the components described herein may be replaced by equivalent components presented hereafter. Various modifications to the disclosure will be readily apparent to those skilled in the art, and the generic principles defined herein may be applied to other variations without departing from the scope of this disclosure. Thus, the disclosure is not limited to the examples and designs described herein, but is to be accorded the broadest scope consistent with the principles and novel features as disclosed herein.

What is claimed is:
1. An airborne device, the airborne device having an associated bus interface, the airborne device comprising:
    a dedicated wireless transmission apparatus connected to the bus interface, wherein the dedicated wireless transmission apparatus comprises:
    an interface conversion module; and
    a wireless transmission module,
    wherein the interface conversion module is configured to convert bus data received from the bus interface into a data packet suitable for transmission using a specific radio access technology, and to convert a data packet received from the wireless transmission module into bus data corresponding to the bus interface, wherein the wireless transmission module is configured to use the specific radio access technology to transmit the data packet converted by the interface conversion module to an airborne wireless interconnection network apparatus, and to receive the data packet transmitted using the specific radio access technology from the airborne wireless interconnection network apparatus, wherein the airborne wireless interconnection network apparatus is configured to build an internal wireless communication network for an aircraft, wherein the airborne wireless interconnection network apparatus comprises a radio access network and a core network, wherein the radio access network comprises an airborne base station.

2. The airborne device according to claim 1, wherein the specific radio access technology comprises 5G radio access technology.

3. The airborne device according to claim 1, wherein the bus interface comprises one of: an ARINC 429 interface, an ARINC 664 interface, an ARINC 825 interface, an analog interface, a discrete interface, or an Ethernet interface.

4. The airborne device according to claim 1, wherein the dedicated wireless transmission apparatus is configured with a fixed IP address.

5. The airborne device according to claim 4, wherein the wireless transmission module is further configured to determine whether a received data packet is directed to the airborne device by parsing an IP address contained in the received data packet.

6. A system for wireless interconnection between airborne devices of an aircraft, the system comprising:

an airborne wireless interconnection network apparatus, wherein the airborne wireless interconnection network apparatus is configured to build an internal wireless communication network for the aircraft, wherein the airborne wireless interconnection network apparatus comprises a radio access network and a core network, wherein the radio access network comprises an airborne base station; and one or more airborne devices according to claim 1.

7. The system according to claim 6, wherein the wireless communication network comprises a 5G wireless communication network.

* * * * *